United States Patent Office 3,510,858
Patented May 5, 1970

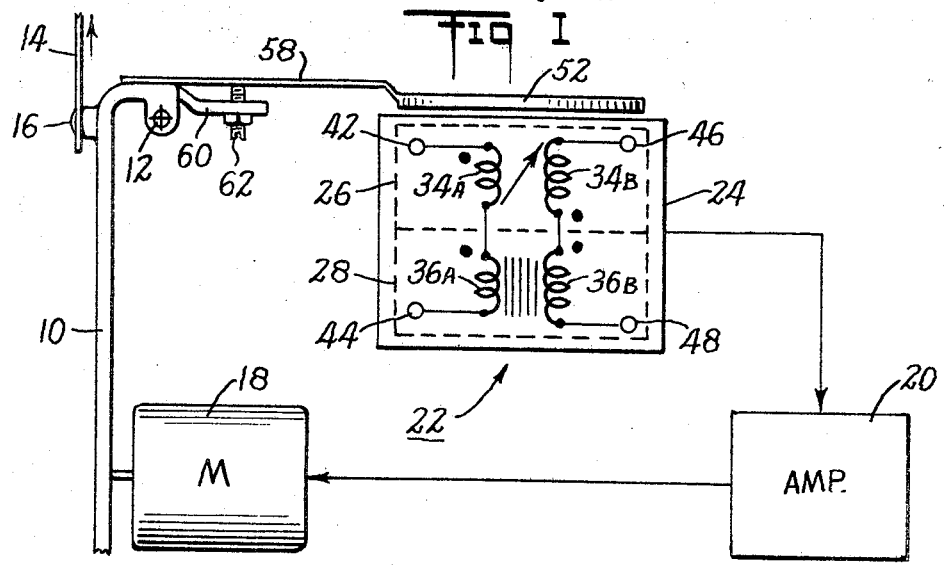
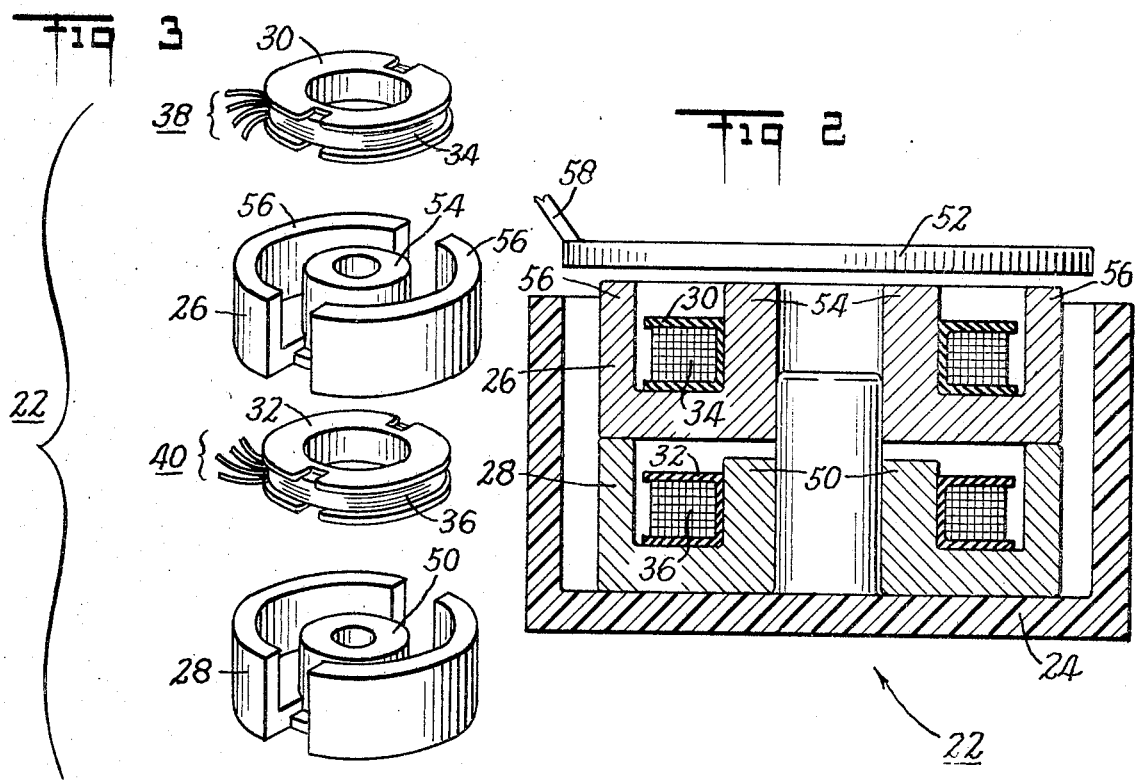
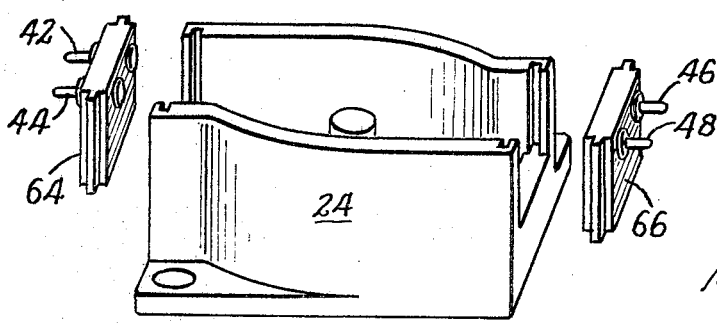

3,510,858
FORCE-BALANCE INSTRUMENT WITH ELECTRICAL DETECTOR ARRANGEMENT
Allan L. Flanagan, Attleboro, Mass., assignor to The Foxboro Company, Foxboro, Mass.
Filed Sept. 8, 1967, Ser. No. 666,421
Int. Cl. G05f 1/14; G08c 25/00
U.S. Cl. 340—187                                    8 Claims

ABSTRACT OF THE DISCLOSURE

A force-balance instrument providing a direct-current output signal corresponding to the magnitude of a condition being measured, the instrument including a magnetic detector for sensing any unbalance of forces and comprising two winding sets each including two windings coupled together by a respective flux path defined by a corresponding magnetic core structure, the first core structure having pole pieces forming an air gap facing away from the second core structure so as to receive a control member adapted for movement towards and away from the air gap without encountering mechanical interference from the second core structure, the windings on that other core structure serving as a temperature compensating circuit for the windings on the first core structure, both sets of windings being coupled to an amplifier to produce a motor current for maintaining a balance of forces in the instrument.

---

This invention relates to measuring instruments adapted to produce an electrical output signal corresponding to the magnitude of a process condition such as flow rate, liquid level, etc. More particularly, this invention relates to such instruments of the force-balance type wherein an electrically-operated detector is provided to sense changes in the balance of forces and to control a rebalance force accordingly.

Force-balance instruments of various kinds are available commercially for producing electrical output signals corresponding to a process condition. Such an instrument typically may take the form of a differential-pressure transmitter adapted to receive two fluids at different pressures and to produce a D-C output signal responsive to the difference in pressures. Generally, the output signal will be transmitted to a remote point to operate an indicator, recorder or controlling device. One configuration for such a force-balance instrument is disclosed in U.S. Pat. No. 2,956,212 issued to E. O. Olsen on Oct. 11, 1960.

The instrument shown in that Olsen patent includes a pivotally-mounted force bar one end of which is connected to a pressure-responsive diaphragm to apply to the force bar a torque proportional to the differential pressure being measured. The force bar also receives an opposing torque from a motor energized by a D-C current controlled by a detector responsive to slight changes in position of the force bar. The detector of that instrument specifically comprises (1) a pair of U-shaped cores disposed in facing relation with suitable windings on each, (2) an armature of magnetic material positioned between the cores, and (3) linkage means connecting the armature to the force bar in such a manner that the distance between the armature and the cores is determined by the rotational position of the force bar about its pivot axis.

The windings on the cores are coupled to an amplifier circuit (such as that shown in U. S. Pat. 3,051,933) arranged to produce a D-C current for the rebalance motor. Feedback action automatically sets the motor current at the correct magnitude to maintain the force bar essentially stationary as the input differential pressure varies through the instrument operating range. The current flowing through the motor windings also serves as an output signal indicating the magnitude of the applied differential pressure.

At times, the differential pressure applied to the force bar may become excessive. For example, through inadvertence the pressure on only one side of the pressure-responsive diaphragm may be vented to atmosphere so that the differential pressure becomes equal to the full static fluid pressure. Since static pressures run as high as several thousand pounds, it is evident that the instrument can be subjected to overrange conditions of considerable intensity.

Although the pressure-responsive diaphragm can be protected from damage under such overrange conditions by the use of conventional back-up plates, it has not readily been possible to provide comparable protection for an electrical detector of the type shown in the above-mentioned Olsen patent. This is due in large part from the fact that in order to obtain sufficient detector sensitivity, its movable armature must be quite close to both of the facing magnetic cores. Thus, if there is any substantial overrange movement in either direction, the armature will strike one of the cores before the pressure-responsive diaphragm reaches its back-up plate, thereby possibly causing severe damage to the operating mechanism.

Accordingly, it is an object of this invention to provide an electrical force-balance instrument which is superior to such instruments provided heretofore. A more specific object of this invention is to provide such an instrument which can be subjected to overrange loads without damaging the mechanisms associated with detecting unbalanced force conditions. Other objects, aspects and advantages of the invention will in part be pointed out in, and in part apparent from, the following description considered together with the accompanying drawings, in which:

FIG. 1 shows in schematic outline a portion of a force-balance instrument incorporating the present invention;

FIG. 2 is a cross-sectional view showing the internal core and winding layout; and FIG. 3 is an exploded view of the core and winding asesmbly.

Referring now to FIG. 1, the force-balance instrument comprises a balanceable member in the form of an L-shaped lever 10 pivoted on cross flexures 12. An upwardly-directed input force is applied to lever 10 through a flexible strip 14 pinned to the lever at 16. The remote end of this strip is connected to a mechanism (not shown herein) responsive to a process condition and arranged in such a way that the applied input force is proportional to the magnitude of such condition. For example, the flexible strip 14 might be connected through suitable linkages to the pivoted force bar of a differential pressure instrument such as shown in the above-mentioned Olsen patent.

Connected to the lower end of lever 10 is the armature of an electrical motor 18 arranged to apply a rebalance force tending to rotate the lever counter-clockwise, i.e. in opposition to the torque developed by the input force from strip 14. This motor 18 may be of any conventional construction providing a suitable linear relationship between motor current and output force. For example, the motor may be of the so-called voice coil type wherein the armature carries a winding which is located within the constant flux field produced by a permanent magnet. The motor current is derived from the D-C output of solid-state transistor amplifier 20 controlled by a force-balance detector 22 to be described hereinbelow in more detail.

Referring now to FIGS. 2 and 3, the detector 22 includes an outer molded casing 24 containing two similar cup cores 26 and 28 formed of magnetic material. These cup cores are cemented in place one above the other, with the open tops facing upwards. Both cup cores contain identical bobbins 30 and 32 with winding sets 34 and 36. Each winding set contains two coaxial windings having individual lead wires generally indicated at 38 and 40.

The winding sets 34 and 36 are connected together in the manner illustrated in FIG. 1. That is, the top two windings 34A and 34B are connected respectively to the bottom two windings 36A and 36B. Also, as indicated by the dot symbols, the relative polarity of windings 34A and 34B is reversed with respect to that of windings 36A and 36B. Thus, a voltage applied to terminals 42 and 44 will produce oppositely-phased voltages in windings 34B and 36B. If the inductive coupling between the top windings 34A and 34B is the same as that between the bottom windings 36A and 36B, and if the reluctances of the two flux paths linking the respective winding sets are the same, the net voltage between terminals 46 and 48 would be zero.

The degree of coupling between the top windings 34A and 34B will be the same as that between the lower windings 36A and 36B because the winding arrangements are identical, the two winding sets being wound in close coaxial fashion as by means of a conventional winding machine. However, the reluctances of the two flux paths will in general not be the same, as will be explained hereinbelow in more detail.

With reference first to the lower windings 36A and 36B, the flux path linking these windings includes the lower cup core 28, the bottom of the upper cup core 26, and the air gap between that core bottom and the inner pole piece ring 50 of the lower core. The elements making up this flux path are fixed in position, and hence the reluctance is constant except for possible changes due to ambient temperature.

The flux path for the top windings 34A and 34B comprises the top cup core 26, a control member 52 of magnetic material, and two air gaps between member 52 and the pole pieces defined by inner and outer core ring 54 and 56. Control member 52 is circular as seen in plan view, and is aligned with the two pole pieces 54 and 56.

Control member 52 is mounted on a flexible strip 58 secured to the rigid horizontal arm 60 of the lever 10, and thus moves towards or away from core 26 as the lever rotates about pivot axis 12. Arm 60 also carries an adjustment screw 62 the upper end of which bears against flexible support strip 58 to set the initial vertical position of the control member. This position is set to produce a flux path reluctance for the top windings 34 very nearly the same as that of the lower windings 36, but slightly different so that when a voltage is applied to terminals 42, 44, there will be a corresponding but small voltage at terminals 46, 48. The magnitude of the output voltage is very sensitively responsive to changes in positioning of control member 52 relative to cup core 26.

The detector 22 is coupled to the amplifier 20 in the manner disclosed in the above mentioned U.S. Pat. 3,051,933, which also shows a suitable amplifier circuit. As explained in that patent, the detector is coupled as a positive feedback element around one transistor and serves, in the manner of a differential transformer, to vary the amount of feedback so as to control the amplitude of oscillations. The oscillatory output is rectified and further amplified to provide a relatively high-powered direct current to drive the rebalance motor 18 and to serve as an output signal for the instrument.

Whenever the input force from strip 14 changes, there will be a corresponding slight change in the position of control member 52 so as to make a change in the motor current sufficient to re-establish balanced torque conditions on the lever 10. The sensitivity of the detector 22 is very great, so that the movement of the control member 10 will be quite small as the output of the instrument varies throughout its normal operating range.

The distinctive feature of the disclosed instrument arrangement is that it can withstand overrange conditions without damage to the detector 22 or associated mechanisms. For example, if an overrange condition caused greatly excessive upwards force to be applied through strip 14 to lever 10, the lever would rotate clockwise beyond its normal range and cause the control member 52 to contact the cup core 26. Further rotation of the lever, however, would merely cause the flexible support strip 58 to bend, as the adjustment screw 62 lifts off from the underside of the support strip. Thus the control member would apply only a light spring load against the cup core. This spring pressure is not sufficient to damage the structure.

If the overrange condition were in the opposite direction, the control member 52 would rotate counter-clockwise with the lever 10 without encountering any interference, so no damage would result. This is in contrast to the arrangement of the above mentioned Olsen patent wherein the control member (or armature) of the detector is located between two closely-spaced magnetic sensing elements, thus preventing such free movement as is possible in the upwards direction with the present construction.

The lower windings 36 have a fixed flux path and thus are not involved in the sensing function of the detector. These lower windings, however, perform an important function in providing compensation for the effects of ambient temperature on the flux path of the top windings 34. That is, the effect of any change in reluctance of the upper flux path, due to a change in temperature, will be nullified by the equal change in reluctance of the lower flux path. This equal compensation effect results from the symmetry between the two flux paths, and the fact that the lower windings are coupled in reverse polarity sense relative to the upper windings.

The arrangement of the detector 22 provides for ready manufacture and reliable operation. The interior of the casing 24 preferably is filled with a potting compound to hold all of the parts rigidly in place. The casing also may include slidably mounted end panels 66 and 64 providing terminal connections to the interior windings.

While there has been described what is at present considered to be the preferred embodiment of this invention, it will be apparent to those skilled in the art that various changes and modifications may be made therein without departing from the scope of this invention; thus the showing herein is for the purpose of illustrating the invention to enable others skilled in this art to adapt the invention in such ways as meet the requirements of particular applications.

I claim:

1. In a force-balance measuring instrument for producing an electrical output signal corresponding to a process condition and comprising a balanceable member with means for applying thereto an input force responsive to the process condition being measured, the instrument also including electrically-operated motor means to apply to said balanceable member a rebalance force opposing said input force, the electrical current to said motor being supplied by an amplifier controlled by a detector responsive to small changes in the position of said balanceable member so as to maintain the forces on said member in balance with virtually no movement thereof throughout the normal operating range of the instrument; that improvement in said instrument wherein said detector comprises: first and second coil means mounted in close proximity in a relative orientation providing inductive coupling therebetween; first magnetic material defining a first core structure substantially surrounding said first and second coil means and providing a low-reluctance linking flux path therefor; second magnetic material defining a second core structure in the form of a container of generally cup-shaped configuration mounted immediately adjacent said first core structure with the mouth of the cup facing away therefrom; third and fourth coil means mounted in said container in close proximity in a relative orientation providing inductive coupling therebetween; a control member of magnetic material disposed over the mouth of said cup-shaped member for movement towards and away from said container in response to changes in position of said balanceable member, said control member serving as a part of the flux path linking said third and fourth coil means and providing an overall magnetic reluctance for said path determined by the spacing between said control member and said container; and circuit means coupling said coil means to said amplifier means to produce for said motor means an amplifier output signal corresponding to the position of said control member relative to said container.

2. An instrument as claimed in claim 1, including overrange disengagement coupling means linking said control member to said balanceable member, said disengagement means including a rigid normally-engaged positive connection between said two members and means to release such positive engagement when said control member is pressed against said pole pieces under overrange conditions.

3. An instrument as claimed in claim 2, wherein said coupling means includes a flexible strip between said balanceable member and said control member; and a rigid lever connected to said balanceable member and having a part engaged with said flexible strip to bend said strip slightly in a direction to move said control member away from said container, said part becoming disengaged from said strip when said balanceable member moves said control member into contact with said container.

4. An instrument as claimed in claim 1, wherein said first and second core structures are both cup cores mounted one above the other, the base of one of said cup cores serving as part of the flux path at the open mouth of the other cup core.

5. An instrument as claimed in claim 4, wherein each of said cup cores includes a bobbin carrying a pair of coils.

6. In a force-balance measuring instrument for producing an electrical output signal corresponding to a process condition and comprising a balanceable member with means for applying thereto an input force responsive to the process condition being measured, the instrument also including electrically-operated motor means to apply to said balanceable member a rebalance force opposing said input force, the electrical current to said motor being supplied by an amplifier controlled by a detector responsive to small changes in the position of said balanceable member so as to maintain the forces on said member in balance with virtually no movement thereof throughout the normal operating range of the instrument; that improvement in said instrument wherein said detector comprises: first and second coil means; a first core structure of magnetic material providing a first closed flux path of relatively low reluctance linking said first and second coil means; third and fourth coil means; a second core structure of magnetic material closely adjacent said first structure and defining one part of a second closed flux path linking said third and fourth coil means, said second structure having two spaced pole pieces establishing an air gap in said second flux path, said pole pieces being positioned on a side of said second structure remote from said first structure; a control member of magnetic material disposed alongside both of said pole pieces and bridging said air gap so as to serve as another part of said second flux path, the distance between said control member and said pole pieces thereby being a determinant of the reluctance of said second flux path, said control member being located at said side of said second structure which is remote from said first structure; and means mounting said control member for movement towards and away from at least one of said pole pieces in response to changes in the position of said balanceable member, whereby to alter the reluctance of said second flux path so as to produce for said motor means an amplifier output signal corresponding to the position of said balanceable member.

7. An instrument as claimed in claim 6, including disengageable means linking said balanceable member and said control member, to provide for disengagement thereof whenever said control member is pressed against said second core structure under overrange conditions, thereby to avoid damaging the detector mechanism.

8. An instrument as claimed in claim 7, including circuit means connecting said coil means to said amplifier to provide from said first and second coil means a voltage tending to nullify changes in amplifier output due to changes in reluctance of said flux paths resulting from temperature variations.

References Cited

UNITED STATES PATENTS

| 1,953,819 | 4/1934 | Payne | 340—187 |
|---|---|---|---|
| 2,494,579 | 1/1950 | Pimlott et al. | 336—83 |
| 3,051,933 | 8/1962 | Cressey et al. | 340—187 |

JOHN W. CALDWELL, Primary Examiner

C. M. MARMELSTEIN, Assistant Examiner

U.S. Cl. X.R.

336—83